(12) United States Patent
Sanford

(10) Patent No.: X8051
(45) Date of Patent: Mar. 7, 1834

(54) SKATES

(76) Inventor: Nathaniel C. Sanford

The schedule referred to, in these Letters Patent, and making part of the same, containing a description in the words of the said Nathaniel C. Sanford himself of his improvement in, Common Skates, To all people, to whom these presents shall come, Know ye, that I Nathaniel C. Sanford of Meriden in the County of New Haven & State of Connecticut, a Citizen of the United States, have made invented & brought into use a new & useful improvement in Common skates; which I describe and make known & specify in manner following, The bottom of the skates as heretofore made has been either flat leaving the two corners at the bottoms on each side of the skate rectangular or square, or the bottom has been grooved or hollowed out in the middle having the said two corners more prominent and angular & so as to be included in an acute angle bounded by a straight line on one side and a curve line on the other side of the angle.

My improvement consists in forming two or more grooves or channels, in the bottom of the instrument in such a manner as to form acute angles on either side of the bottom of the same & to leave one or more bearings between the two angular edges or corners.

This may be done by angular or curved grooves cut on the bottom of the skate & thus leaving the bearing either flat or circular or in any other way, so that the bearing between the corners or edges shall project full as far, as the corners do & receive the weight of the body when the skater places the skate perpendicular to the ice. I know of no advantage in having more than two grooves or channels on the bottom.

In order that the above description may be more fully understood I annex a drawing which exhibits sections of the flat bottomed & the single grooved bottomed skates of my improved instrument with a double grooved bottom,

I claim as my improvement simply & only the formation of skates with more than one channel on the bottom & so as have a flat or convex bearing on the bottom between the two angular corners of the bottom of the instrument.

All the residue of the instrument may be formed in the usual way. The obvious advantages of the improvement consists in combining all the useful properties of both the kinds of skates now in use in one instrument.

In testimony that the above & foregoing is a true specification of my said improvement I have hereunto set my hand at Meriden this 20th day of January AD 1834

Nathaniel C. Sanford

Witnesses
Elizabeth Andrews
Benejah Andrews

5061 [illegible]

Exd [illegible]

(Patented March 7. 1834)